United States Patent
Agata et al.

(10) Patent No.: US 8,142,901 B2
(45) Date of Patent: Mar. 27, 2012

(54) BARRIER LAMINATE AND METHOD FOR PRODUCING SAME, BARRIER FILM SUBSTRATE, DEVICE AND OPTICAL COMPONENT

(75) Inventors: Yuya Agata, Kanagawa (JP); Masaharu Sugai, Shizuoka (JP)

(73) Assignee: Fujifilm Corporation, Tokyo (JP)

( * ) Notice: Subject to any disclaimer, the term of this patent is extended or adjusted under 35 U.S.C. 154(b) by 507 days.

(21) Appl. No.: 12/406,342

(22) Filed: Mar. 18, 2009

(65) Prior Publication Data

US 2009/0239089 A1 Sep. 24, 2009

(30) Foreign Application Priority Data

Mar. 21, 2008 (JP) .................. 2008-074411

(51) Int. Cl.
*B32B 9/04* (2006.01)
*B32B 27/00* (2006.01)
(52) U.S. Cl. .................. 428/500; 428/411.1
(58) Field of Classification Search .......... None
See application file for complete search history.

(56) References Cited

U.S. PATENT DOCUMENTS 4,842,893 A * 6/1989 Yializis et al. ............. 427/497
6,214,422 B1 * 4/2001 Yializis ...................... 427/488

FOREIGN PATENT DOCUMENTS

JP 2007-076207 A 3/2007

OTHER PUBLICATIONS

Database WPI Week 200731, Thomson Scientific, London, United Kingdom, XP-002537698.

* cited by examiner

*Primary Examiner* — Sheeba Ahmed
(74) *Attorney, Agent, or Firm* — Birch, Stewart, Kolasch & Birch, LLP

(57) ABSTRACT

A barrier laminate having an organic layer and an inorganic layer, in which the organic layer contains a polymer having a structural unit of the following formula (1):

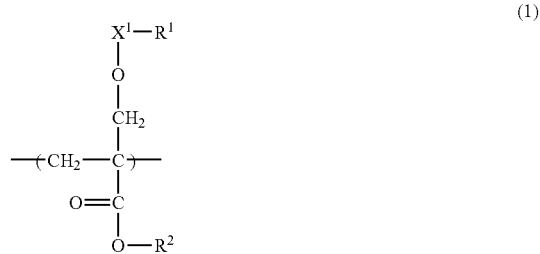

wherein $R^1$ represents a hydrogen atom or a hydrocarbon group; $R^2$ represents a hydrocarbon group; $X^1$ represents a single bond or a carbonyl group.

13 Claims, No Drawings

BARRIER LAMINATE AND METHOD FOR PRODUCING SAME, BARRIER FILM SUBSTRATE, DEVICE AND OPTICAL COMPONENT

BACKGROUND OF THE INVENTION

1. Field of the Invention

The present invention relates to a barrier laminate, especially to a barrier laminate excellent in producibility and having a low water vapor permeability, and further to a barrier film substrate, a device and an optical component comprising the barrier laminate.

2. Description of the Related Art

Heretofore, a barrier film fabricated by forming a thin metal oxide film of aluminum oxide, magnesium oxide, silicon oxide or the like on the surface of a plastic film is widely used for wrapping or packaging articles that require shielding from various gases such as water vapor or oxygen and for wrapping or packaging edibles, industrial articles and medicines for preventing them from being deteriorated.

Recently, in the field of liquid-crystal display devices and organic EL devices, plastic film substrates are being used in place of glass substrates that are heavy and readily cracked or broken. As applicable to a roll-to-roll system, plastic film substrates are advantageous in point of cost. However, plastic film substrates are problematic in that their water vapor-barrier capability is not good as compared with that of glass substrates. Therefore, when a plastic film substrate is used in a liquid-crystal display device, then water vapor may penetrate into the liquid-crystal cell, thereby causing display failures.

For solving the problem, it is known to use a barrier film substrate produced by forming a water vapor barrier layer on a plastic film. As such a barrier film substrate, known are one produced by depositing silicon oxide on a plastic film in a mode of vapor deposition (e.g., see JP-B 53-12953 (pp. 1-3)), and one produced by depositing aluminum oxide thereon (e.g., see JP-A 58-217344 (pp. 1-4)); and their barrier capability is on a level of 1 g/m²/day or so in terms of the water vapor permeability.

However, the substrate for use in organic EL devices is required to have a water vapor barrier capability on a higher level. As a means for satisfying the requirement, reported are a technique of employing an organic/inorganic barrier laminate produced by laminating an organic layer and an inorganic layer, thereby realizing a water vapor permeability of less than 0.1 g/m²/day (e.g., see JP-A 2003-335880 and JP-A 2003-335820), and a technique of realizing a more excellent water vapor barrier capability on a level of less than 0.01 g/m²/day in terms of water vapor permeability (see U.S. Pat. No. 6,413,645).

However, the organic/inorganic laminate barrier film substrates disclosed in these are problematic in that the organic layer therein is formed under an oxygen-free condition such as in vacuum or in a nitrogen stream atmosphere, therefore requiring additional equipment, long time and high cost; and the simplification of the film-forming step is a significant theme to be attained in the barrier laminate production.

SUMMARY OF THE INVENTION

A first object of the invention is to provide an organic/inorganic barrier laminate having an excellent barrier property, in which the organic layer can be formed in a simplified method capable of saving time and cost. A second object of the invention is to provide a barrier film substrate of high barrier capability and a device and an optical component of high durability, comprising the barrier laminate.

The present inventors have assiduously studied and, as a result, have found that, when an acryl monomer derivative having a specific structure that does not receive polymerization inhibition by oxygen during curing, is used as a monomer for polymer production in forming an organic layer of a barrier laminate, then a barrier laminate can be produced according to a more simplified method than before, not detracting from the barrier property thereof; and on the basis of the findings, the inventors have proposed the present invention described below.

[1] A barrier laminate having at least one organic layer and at least one inorganic layer, in which the organic layer is a layer that contains a polymer having a structural unit of the following formula (1) or the following ormula (2):

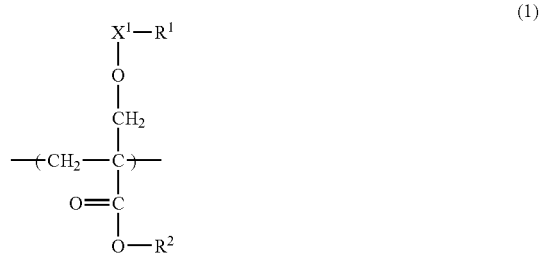

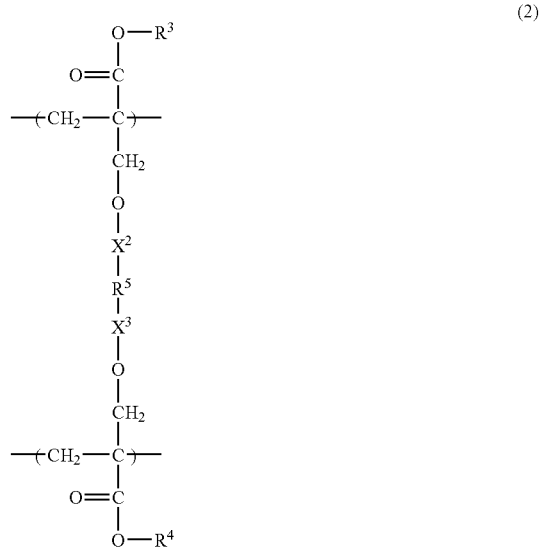

wherein $R^1$ represents a hydrogen atom or a hydrocarbon group; $R^2$ to $R^4$ each independently represent a hydrocarbon group; $R^5$ represents an alkylene group which may have an ether group inserted into the chain; $X^1$ to $X^3$ each independently represent a single bond or a carbonyl group.

[2] A method for producing a barrier laminate having at least one organic layer and at least one inorganic layer, which comprises polymerizing a monomer mixture that contains at least one monomer of the following formula (3) or the formula (4) to form the organic layer:

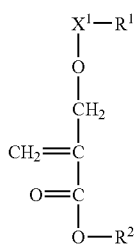

(3)

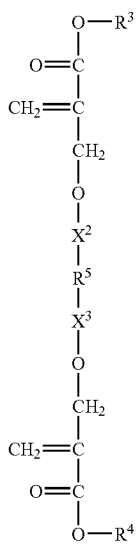

(4)

wherein $R^1$ represents a hydrogen atom or a hydrocarbon group; $R^2$ to $R^4$ each independently represent a hydrocarbon group; $R^5$ represents an alkylene group which may have an ether group inserted into the chain; $X^1$ to $X^3$ each independently represent a single bond or a carbonyl group.

[3] The method for producing a barrier laminate of the above [2], wherein the organic layer is formed in the presence of oxygen.

[4] A barrier laminate produced according to the production method of the above [2] or [3].

[5] A barrier film substrate having a barrier laminate of the above [1] or [4] on at least one surface of a plastic film.

[6] The barrier film substrate of the above [5], which has at least one above barrier laminate and a matting amget layer formed thereon, on one surface of the plastic film, and has at least one above barrier laminate on the other surface thereof.

[7] A device sealed up with a barrier laminate of the above [1] or [4].

[8] A device having, as the substrate thereof, a barrier film substrate of the above [5] or [6].

[9] A device sealed up with a barrier film substrate of the above [5] or [6].

[10] The device of any one of the above [7] to [9], which is an electronic device.

[11] The device of any one of the above [7] to [9], which is an organic EL device.

[12] An optical component having, as the substrate thereof, a barrier film substrate of the above [5] or [6].

In the barrier laminate of the invention, the organic layer can be formed in a simplified method, and the barrier laminate has an excellent barrier property. According to the production method of the invention, the barrier laminate can be produced easily, with saving time and cost. Further, the barrier film substrate of the invention has an excellent barrier property, and the device and the optical component of the invention have good durability.

BEST MODE FOR CARRYING OUT THE INVENTION

The barrier laminate and its production method, the barrier film substrate, the device and the optical component of the invention are described in detail hereinunder. The description made hereinunder is for some typical embodiments of the invention, to which, however, the invention should not be limited. In this description, the numerical range expressed by the wording "a number to another number" means the range that falls between the former number indicating the lowermost limit of the range and the latter number indicating the uppermost limit thereof. In the structural formulae shown in this description, O means an oxygen atom.

<Barrier Laminate and Its Production Method>

The barrier laminate of the invention has at least one organic layer and at least one inorganic layer, and is characterized in that the organic layer is a layer that contains a polymer having a structural unit of the above formula (1) or (2).

The barrier laminate of the invention may be formed in any desired shape, irrespective of the type of the substrate for it. For example, a barrier laminate may be formed directly on a device such as an organic semiconductor device that requires a gas-barrier property; or a gas-barrier laminate may be formed separately on a substrate to be a barrier film substrate.

An inorganic layer and an organic layer that are the indispensable elements of the barrier laminate of the invention are described in detail hereinunder; and the substrate on which the barrier laminate may be formed is described in the section of a barrier film substrate to be given hereinunder.

(Inorganic Layer)

The inorganic layer is generally a layer of a thin film of a metal compound. For forming the inorganic layer, employable is any method capable of forming the intended thin film. For example, a coating method, a sputtering method, a vacuum vapor deposition method, an ion-plating method, a plasma CVD method and the like are suitable for it; and concretely, the methods for film formation described in Japanese Patent 3400324, JP-A 2002-322561 and 2002-361774 are usable herein.

Not specifically defined, the ingredients of the inorganic layer may be any ones satisfying the above-mentioned capabilities, for which, for example, employable are oxides, nitrides, oxinitrides, carbides, oxicarbindes or the like containing at least one metal selected from Si, Al, In, Sn, Zn, Ti, Cu, Ce and Ta. Of those, preferred are oxides, nitrides oxinitrides of a metal selected from Si, Al, In, Sn, Zn and Ti; and more preferred are metal oxides, nitrides or oxinitrides of Si or Al. These may contain any other element as a side component.

Not specifically defined, the thickness of the inorganic layer is preferably within a range of from 5 nm to 500 nm per layer, more preferably within a range of from 10 nm to 200 nm per layer. Two or more inorganic sublayers may be laminated. In this case, the constitutive layers may have the same composition or may have different compositions. The boundary between the organic layer and the inorganic layer may be unclear and the composition may continuously change in the thickness direction as shown in US 2004/46497.

(Organic Layer)

The organic layer is a layer that contains a polymer having a structural unit of the following formula (1) or the following formula (2):

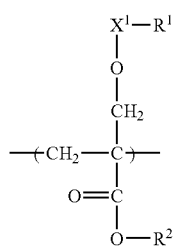
(1)

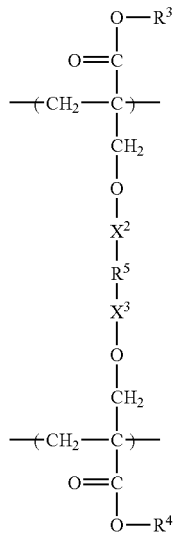
(2)

In the formulae, $R^1$ represents a hydrogen atom or a hydrocarbon group; $R^2$ to $R^4$ each independently represent a hydrocarbon group; $R^5$ represents an alkylene group optionally having an ether group inserted into the chain; $X^1$ to $X^3$ each independently represent a single bond or a carbonyl group.

The hydrocarbon group applicable to $R^1$ to $R^4$ may be a saturated hydrocarbon group or an unsaturated hydrocarbon group, and may have a substituent. The hydrocarbon group includes, for example, an alkyl group, an alkenyl group, an aralkyl group, and an aryl group. Of those, preferred is an alkyl group. The alkyl group may be linear, branched or cyclic. The linear alkyl group includes, for example, a methyl group, an ethyl group, an n-propyl group, an n-butyl group, an n-pentyl group, and an n-hexyl group; the branched alkyl group includes, for example, an isopropyl group, an isobutyl group, and an isopentyl group; the cyclic alkyl group (cycloalkyl group) includes, for example, a cyclopentyl group and a cyclohexyl group. As the alkyl group, preferred is the linear alkyl group or the branched alkyl group, and more preferred is the linear alkyl group. The number of the carbon atoms constituting the linear alkyl group is preferably from 1 to 6, more preferably from 1 to 4. As specific examples of the above alkenyl group, mentioned are those derived from the above alkyl group by substituting a part of the carbon-carbon single bonds with a double bond. As specific examples of the above aryl group, there are mentioned a phenyl group, a 1-naphthyl group and a 2-naphthyl group. As specific examples of the above aralkyl group, mentioned are those derived from the above alkyl group substituted with any of the above specific examples of the aryl group. Substituents of the hydrocarbon group applicable to $R^1$ to $R^4$ include an alkoxy group, a hydroxyl group, etc.; and preferred is a hydroxyl group.

In formula (1), $R^1$'s may bond to each other to form a dimer, which falls within the scope of the invention.

In formula (2), $R^3$ and $R^4$ may be the same or different. Preferably, $R^3$ and $R^4$ are the same.

$R^5$ is an alkylene group optionally having an ether group inserted into the chain, and has a structure of the following formula (5):

$$-R^{11}-(O-R^{12})n-\qquad(5)$$

In the above formula, $R^{11}$ and $R^{12}$ each independently represent an alkylene group, optionally having a substituent. The alkylene group may be linear, branched or cyclic. The linear alkylene group includes, for example, a methylene group, an ethylene group, an n-propylene group, an n-butylene group, an n-pentylene group, and an n-hexylene group; the branched alkylene group includes, for example, an isopropylene group, an isobutylene group, and an isopentylene group; and the cyclic alkylene group (cycloalkylene group) includes, for example, a cyclopentylene group, and a cyclohexylene group. As the alkylene group, preferred is the linear alkylene group or the branched alkylene group; and more preferred is the linear alkylene group. The number of the carbon atoms constituting the linear alkylene group is preferably from 1 to 6, more preferably from 1 to 4. As examples of the substituents for alkylene group, mentioned are those exemplified hereinabove as the substituents for the above-mentioned hydrocarbon group.

In formula (5), n indicates an integer of 0 or more. n is preferably from 0 to 6, more preferably from 0 to 4. When n is 2 or more, then n's $R^{12}$'s may be the same or different.

$X^1$ to $X^3$ each independently represent a single bond or a carbonyl group. In formula (2), $X^2$ and $X^3$ may be the same or different; but preferably, they are the same. In formula (2), more preferably, $X^2$ and $X^3$ are both carbonyl groups.

The organic layer may contain a plurality of different structures of formula (1) or (2), or may contain only one structure thereof. In case where the layer contains a plurality of those structures, it may contain a plurality of the structures of formula (1), or a plurality of the structures of formula (2), or a plurality of the structures of formula (1) and formula (2) as combined.

Preferably, the polymer that constitutes the organic layer contains the structure of formula (1) and the structure of formula (2) in a total amount of from 30 to 100% by mass, more preferably from 60 to 100% by mass, even more preferably from 70 to 100% by mass, still more preferably from 70 to 95% by mass. The amount of the structure to be in the polymer means the proportion by mass of the monomer capable of forming the corresponding structure through polymerization.

The other structure than the structure of formula (1) or formula (2) that may be in the polymer is not specifically defined so far as its amount is within a range not too much detracting from the object of the invention. Preferably, the polymer contains an additional structure derived from an acrylate monomer or a methacrylate monomer.

Preferably, the polymer to constitute the organic layer is produced though polymerization of at least one monomer of the following formula (3) or (4):

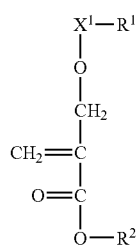
(3)

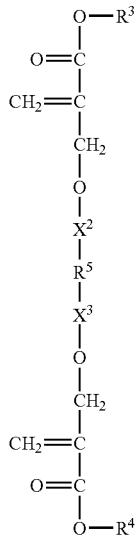
(4)

In the above formulae, $R^1$ represents a hydrogen atom or a hydrocarbon group; $R^2$ to $R^4$ each independently represent a hydrocarbon group; $R^5$ represents an alkylene group optionally having an ether group inserted into the chain; $X^1$ to $X^3$ each independently represent a single bond or a carbonyl group. The detailed description and the preferred range of $R^1$ to $R^5$ and $X^1$ to $X^3$ are the same as the detailed description and the preferred range described hereinabove for the formulae (1) and (2).

Specific examples of the monomers of formula (3) or (4) are shown below, to which, however, the monomers usable in the invention should not be limited.

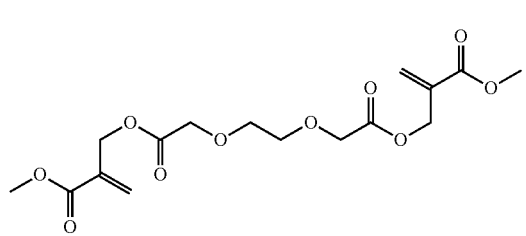
R-1

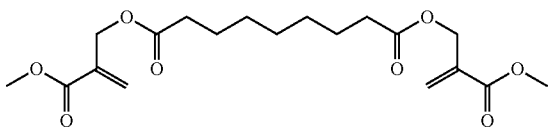
R-2

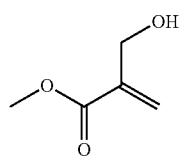
R-3

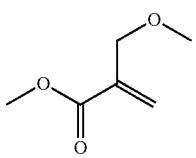
R-4

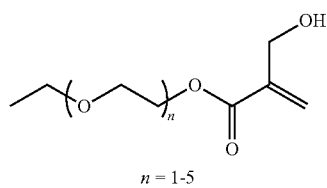
R-5

$n = 1\text{-}5$

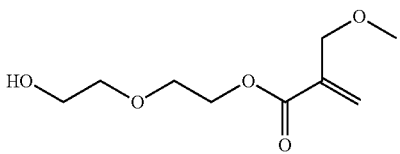
R-6

-continued
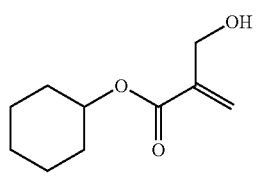
R-7
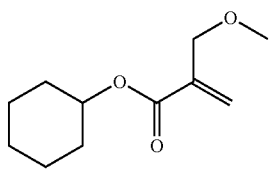
R-8
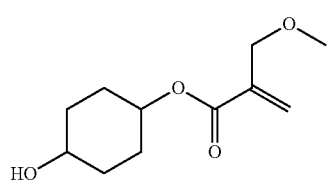
R-9
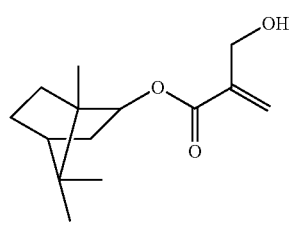
R-10
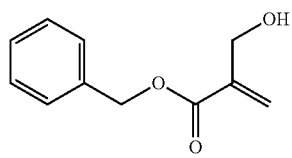
R-11
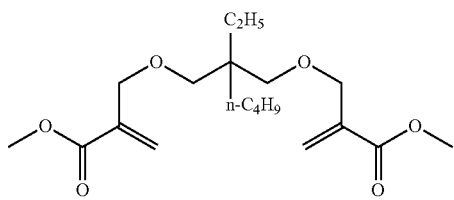
R-12
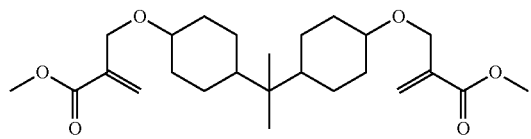
R-13
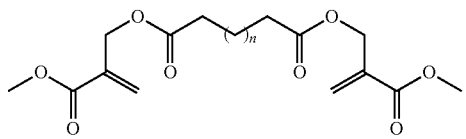
R-14
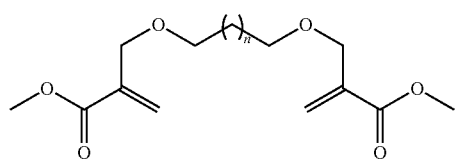
R-15
R-16
$n = 1\sim 8$
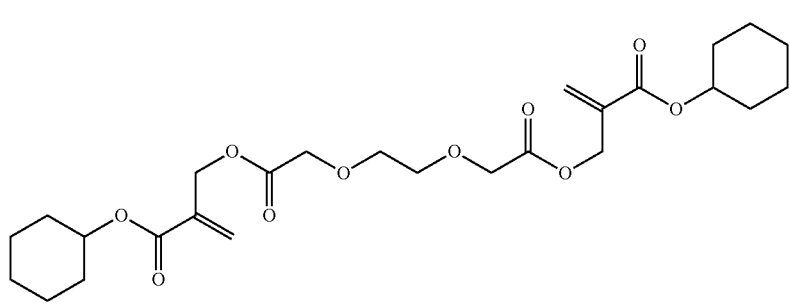
R-17
$n = 1\sim 10$
R-18

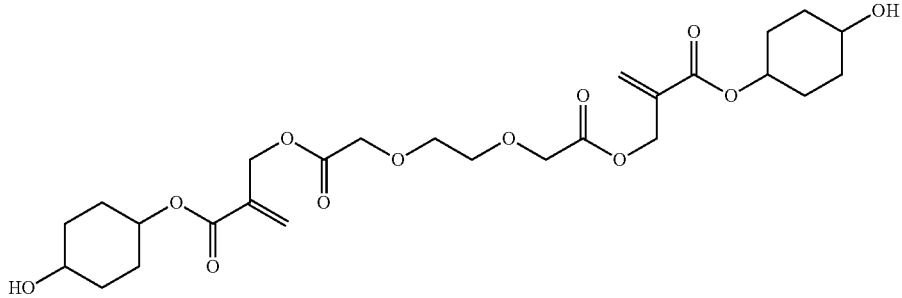

R-19

The monomer mixture for use for preparing the polymer that constitutes the organic layer may contain any other monomer than the monomers of formulae (3) and (4). The additional monomer may be selected from those not too much detracting from the effect of the invention, and its preferred examples are acrylates and methacrylates.

Specific examples of the additional monomers capable of being mixed in the monomer mixture for use herein are shown below, to which, however, the monomers usable in the invention should not be limited.

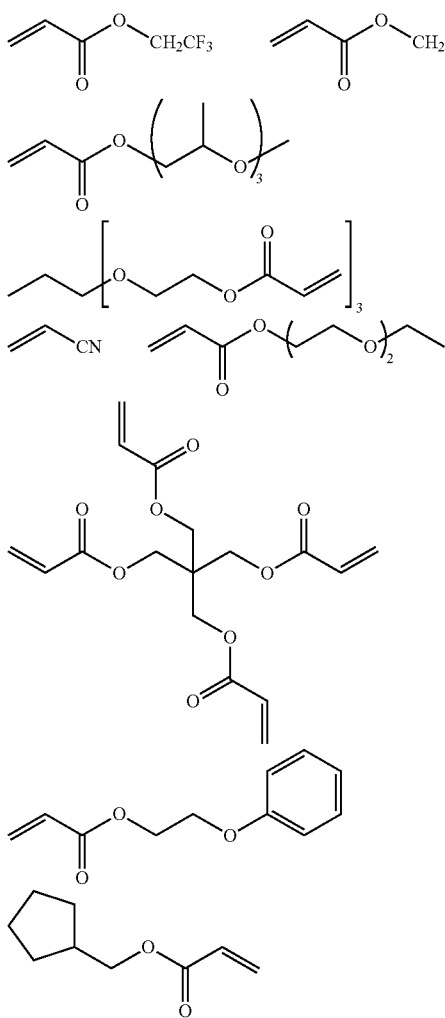

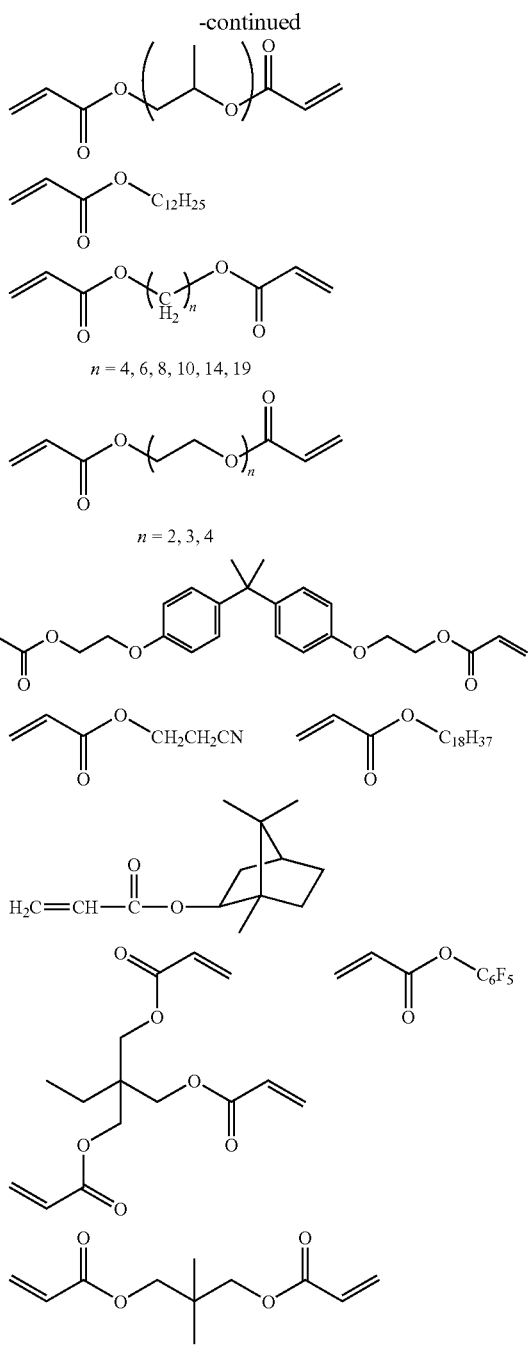

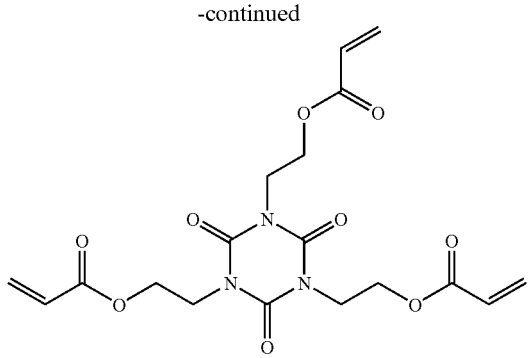
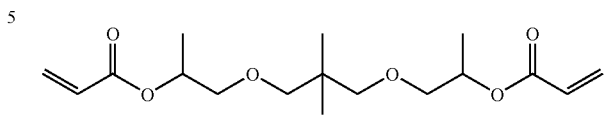
As other examples, further mentioned are the following compounds commercially available in Japan.
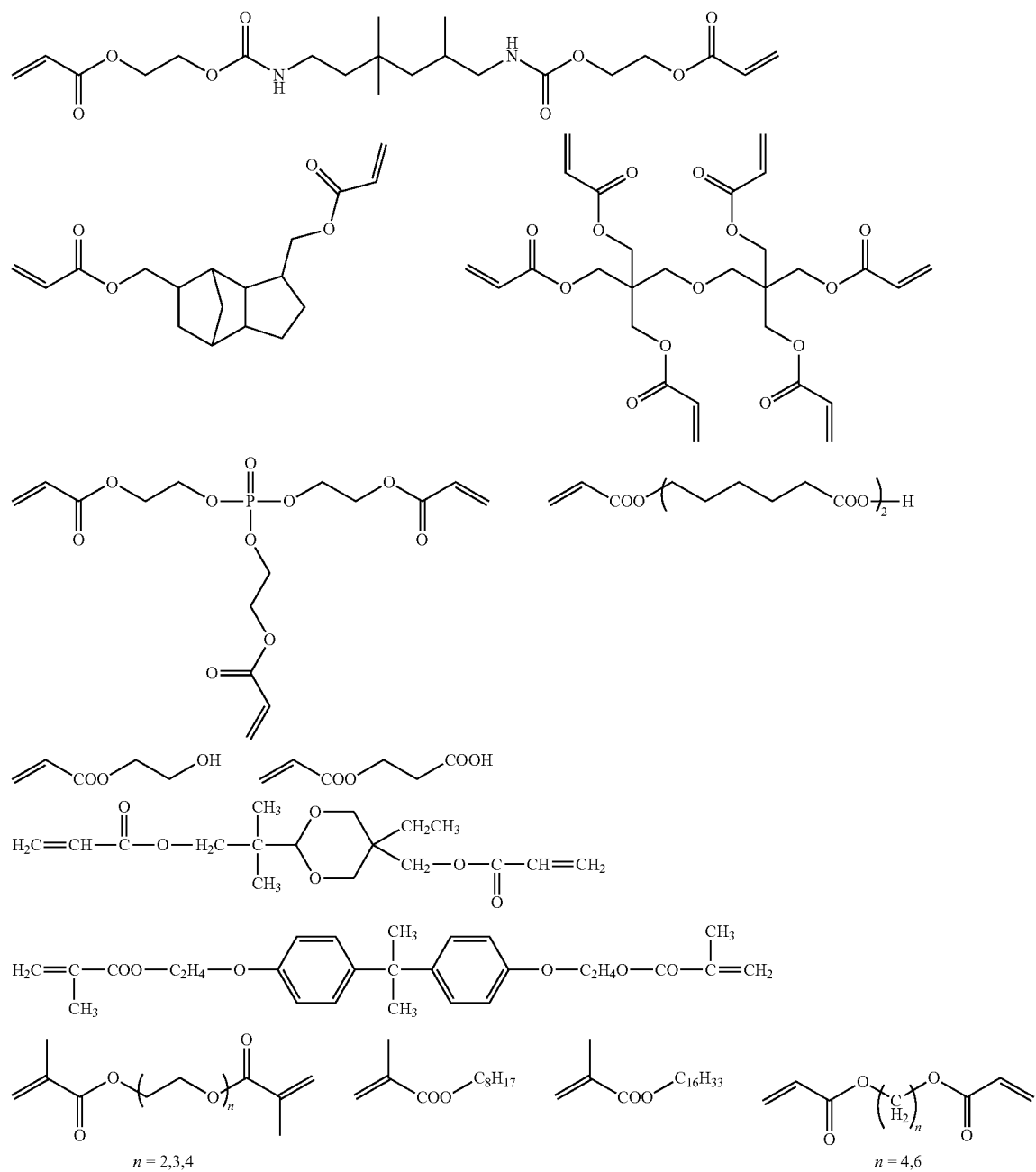

-continued

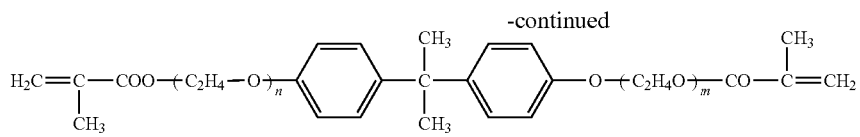

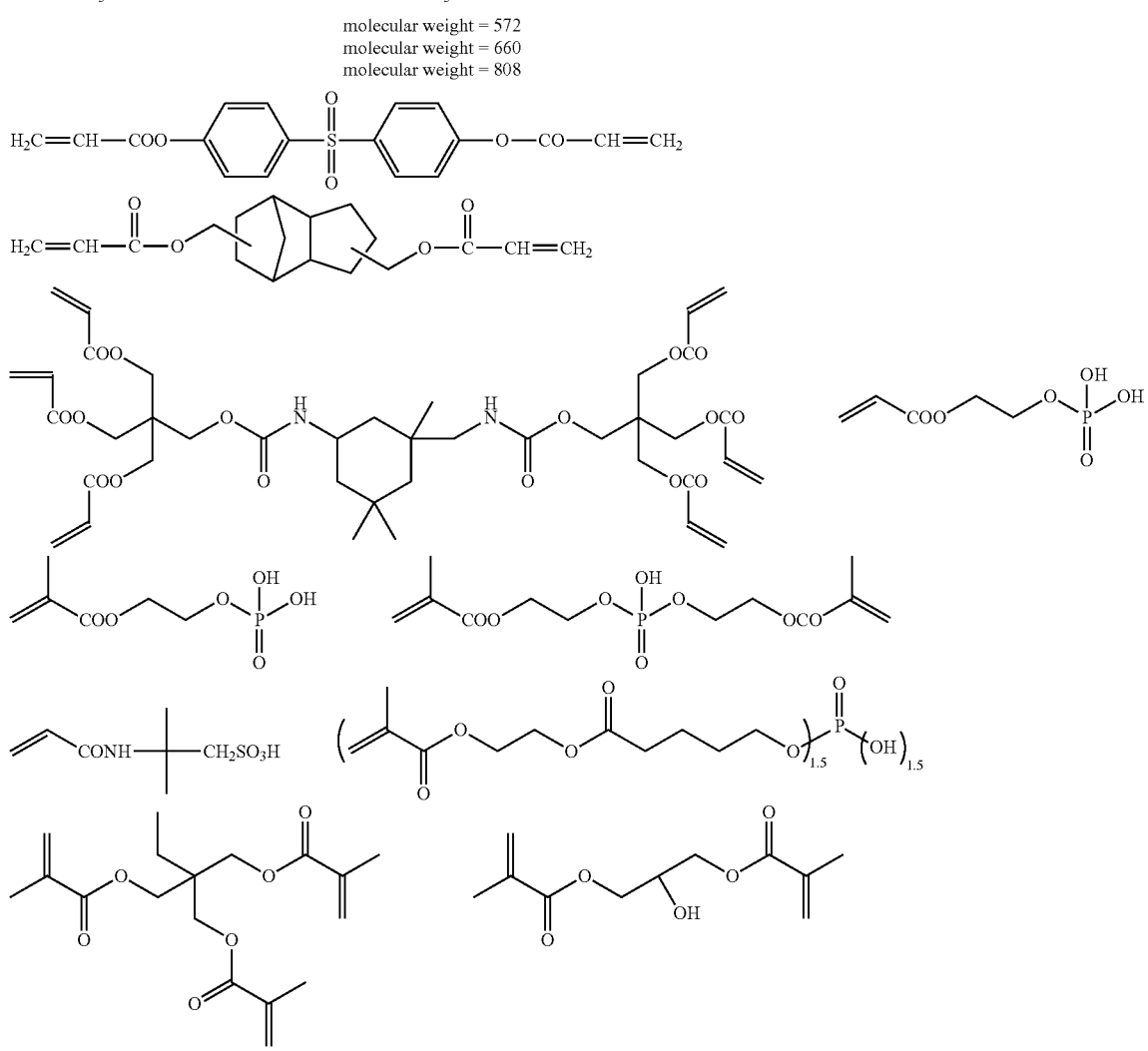

In addition, other monomers than the above such as those described in U.S. Pat. Nos. 6,083,628 and 6,214,422 are also usable herein.

The organic layer may contain a polymer having no structural unit represented by formula (1). Examples of such polymer include thermoplastic resins such as polyester, methacrylic acid/maleic acid copolymer, polystyrene, transparent fluororesin, polyimide, fluoropolyimide, polyamide, polyamidimide, polyether imide, cellulose acylate, polyurethane, polyether ether ketone, polycarbonate, alicyclic polyolefin, polyarylate, polyether sulfone, polysulfone, fluorene ring-modified polycarbonate, alicyclic-modified polycarbonate, fluorene ring-modified polyester and acryloyl compound; and silicon containing polymer such as polysiloxane. The content of the polymer not having the structural unit of formula (1) in the organic layer is preferably from 5 to 50% by mass, more preferably from 10 to 40% by mass, even more preferably from 20 to 35% by mass.

For forming the organic layer, employable are ordinary solution coating method and vacuum film formation method. The solution coating method includes, for example, a dip coating method, an air knife coating method, a curtain coating method, a roller coating method, a wire bar coating method, a gravure coating method, a slide coating method, and an extrusion coating method of using a hopper as in U.S. Pat. No. 2,681,294. Not specifically defined, the vacuum film formation method is preferably a flash vacuum evaporation method as in U.S. Pat. Nos. 4,842,893, 4,954,371 and 5,032,461. Vacuum condition is not always necessary to form the organic layer in the invention. The organic layer is preferably formed by curing in the atmosphere easily.

The monomer polymerization method is not specifically defined, for which, for example, preferred is thermal polymerization, light (UV, visible ray) polymerization, electronic beam polymerization, plasma polymerization or their combination. Of those, especially preferred is photopolymerization. In photopolymerization, a photopolymerization initiator may be used. Examples of the photopolymerization initiator are Irgacure series (e.g., Irgacure 651, Irgacure 754, Irgacure 184, Irgacure 2959, Irgacure 907, Irgacure 369, Irgacure 379, Irgacure 819) sold by Ciba Specialty Chemicals; Darocur series (e.g., Darocur TPO, Darocure 1173); Quantacure PDO; Esacure series (e.g., Esacure TZM, Esacure TZT, Esacure KTO 46) and oligomer-type Esacure KIP series sold by Lamberti.

The light for irradiation is generally UV light from high-pressure mercy lamp or low-pressure mercy lamp. The irradiation energy is preferably at least 0.1 J/cm$^2$, more preferably at least 0.5 J/cm$^2$. Since acrylate and methacrylate generally receive polymerization inhibition by oxygen in air, it is desirable that the oxygen concentration or the oxygen partial pressure during the monomer polymerization is reduced. Since the organic layer does not easily receive polymerization inhibition by oxygen, it is not always necessary to reduce the oxygen concentration by vacuum, substitution for nitrogen and other methods. The oxygen concentration is preferably at most 50%, more preferably at most 30%, still more preferably at most 21%, which is a normal oxygen concentration in the atmosphere.

The thickness of the organic layer is not specifically defined. However, when too thin, the layer could not be uniform; but when too thick, the layer may be cracked and its barrier capability may lower. From these viewpoints, the thickness of the organic layer is preferably from 100 nm to 2000 nm, more preferably from 200 nm to 1000 nm.

Two or more organic sublayers may be laminated. In this case, the constitutive layers may have the same composition or may have different compositions. The boundary between the organic layer and the inorganic layer may be unclear and the composition may continuously change in the thickness direction as shown in US 2004/46497.

(Lamination of Organic Layer and Inorganic Layer)

The organic layer and the inorganic layer may be laminated by repeated film formation to form the organic layer and the inorganic layer in a desired layer constitution. The inorganic layer can be formed according to a vacuum film formation method such as sputtering method, vacuum vapor deposition method, ion plating method or plasma CVD method. Among them, atmospheric plasma CVD method is preferable since the organic layer can be formed in the atmosphere and continuous formation of the organic layer and the inorganic layer is possible. When the organic layer and the inorganic layer are laminated, the organic layer may be first formed on the support and then the inorganic layer may be formed thereon; and preferably, the organic layer is first formed on the support.

(Use of Barrier Laminate)

In general, the barrier laminate of the invention is formed on a support. Selecting the support, the barrier laminate may have various applications. The support includes a substrate film, as well as various devices, optical components, etc. Concretely, the barrier laminate of the invention may be used as a barrier layer of a barrier film substrate. The barrier laminate and the barrier film substrate of the invention may be used for sealing up devices that require gas-barrier performance. The barrier laminate and the barrier film substrate of the invention may be applied to optical components. These are described in detail hereinunder.

<Barrier Film Substrate>

The barrier film substrate comprises a substrate film and a barrier laminate formed on the substrate film. In the barrier film substrate, the barrier laminate of the invention may be provided only one surface of the substrate film, or may be provided on both surfaces thereof. The barrier laminate of the invention may be laminated in an order of the inorganic layer and the organic layer from the side of the substrate film; or may be laminated in an order of the organic layer and the inorganic layer from it. The uppermost layer of the laminate of the invention may be the inorganic layer or the organic layer.

The barrier film substrate of the invention is a film substrate having a barrier layer that functions to shield oxygen, moisture, nitrogen oxide, sulfur oxide, ozone and others in air.

Not specifically defined, the number of the layers that constitute the barrier film substrate may be typically from 2 layers to 30 layers, more preferably from 3 layers to 20 layers.

The barrier film substrate may have any other constitutive components (e.g., functional layers such as easily-adhesive layer) in addition to the barrier laminate and the substrate film. The functional layer may be disposed on the barrier laminate, or between the barrier laminate and the substrate film, or on the side (back) of the substrate film not coated with the barrier laminate.

(Plastic Film)

In the barrier film substrate of the invention, the substrate film is generally a plastic film. Not specifically defined in point of the material and the thickness thereof, the plastic film usable herein may be any one capable of supporting the laminate of the organic layer and the inorganic layer; and it may be suitably selected depending on the use and the object thereof. Concretely, the plastic film includes thermoplastic resins such as polyester resin, methacryl resin, methacrylic acid-maleic anhydride copolymer, polystyrene resin, transparent fluororesin, polyimide, fluoropolyimide resin, polyamide resin, polyamidimide resin, polyetherimide resin, cellulose acylate resin, polyurethane resin, polyether ether ketone resin, polycarbonate resin, alicyclic polyolefin resin, polyarylate resin, polyether sulfone resin, polysulfone resin, cycloolefin copolymer, fluorene ring-modified polycarbonate resin, alicyclic-modified polycarbonate resin, fluorene ring-modified polyester resin, acryloyl compound, etc.

In case where the barrier film substrate of the invention is used as a substrate of a device such as an organic EL device to be mentioned hereinunder, it is desirable that the plastic film is formed of a heat-resistant material. Concretely, the plastic film is preferably formed of a heat-resistant transparent material having a glass transition temperature (Tg) of not lower than 100° C. and/or a linear thermal expansion coefficient of at most 40 ppm/° C. Tg and the linear expansion coefficient may be controlled by the additives to the material. The thermoplastic resin of the type includes, for example, polyethylene naphthalate (PEN: 120° C.), polycarbonate (PC: 140° C.), alicyclic polyolefin (e.g., Nippon Zeon's Zeonoa 1600: 160° C.), polyarylate (PAr: 210° C.), polyether sulfone (PES: 220° C.), polysulfone (PSF: 190° C.), cycloolefin copolymer (COC, compound described in JP-A 2001-150584: 162° C.), polyimide (e.g., Mitsubishi Gas Chemical's Neoprim: 260° C.), fluorene ring-modified polycarbonate (BCF-PC, compound described in JP-A 2000-227603: 225° C.), alicyclic-modified polycarbonate (IP-PC, compound described in JP-A 2000-227603: 205° C.), acryloyl compound (compound described in JP-A 2002-80616: 300° C. or more) (the parenthesized data are Tg). In particular, for high transparency, use of alicyclic polyolefin and the like is preferred.

Since the barrier film substrate of the invention is usable in devices such as organic EL devices, the plastic film is transparent, or that is, its light transmittance is generally at least 80%, preferably at least 85%, more preferably at least 90%. The light transmittance may be measured according to the method described in JIS-K7105. Concretely, using an integrating sphere-type light transmittance meter, a whole light transmittance and a quantity of scattered light are measured, and the diffusive transmittance is subtracted from the whole transmittance to obtain the intended light transmittance of the sample.

Even when the barrier film substrate of the invention is used in displays, it does not always require transparency in a case where it is not disposed on the viewers' side. Accordingly in such a case, a nontransparent material may be used for the plastic film. The nontransparent material includes, for example, polyimide, polyacrylonitrile, known liquid-crystal polymer.

Not specifically defined, the thickness of the plastic film for use in the barrier film substrate of the invention may be suitably selected depending on its use. Typically, the thickness may be from 1 to 800 μm, preferably from 10 to 200 μm. The plastic film may have a functional layer such as a transparent conductive layer, a primer layer, etc. The functional layer is described in detail in JP-A 2006-289627, paragraphs [0036] to [0038]. Examples of other functional layers than those are a mating agent layer, a protective layer, a solvent-resistant layer, an antistatic layer, a planarizing layer, an adhesiveness improving layer, a light shielding layer, an antireflection layer, a hard coat layer, a stress relaxing layer, an antifogging layer, an anti-soiling layer, a printable layer, an easily-adhesive layer, etc.

(Matting Agent Layer)

The barrier film substrate of the invention may have a matting agent layer. Preferably, the barrier film substrate of the invention which is a laminate of an organic layer and an inorganic layer has the barrier laminate on at least one side of the plastic film and has a matting agent layer on the other side thereof. The barrier film substrate of the invention may have at least one barrier laminate on one side of the plastic film and may have a matting agent layer on it. Preferably, this has at least one barrier laminate also on the other side thereof.

The matting agent for use in the invention preferably comprises inorganic or organic fine particles. Concretely, it comprises inorganic particles of silicon dioxide ($SiO_2$), titanium dioxide ($TiO_2$), calcium carbonate, magnesium carbonate or the like, or organic particles of polymethyl methacrylate, cellulose acetate propionate, polystyrene or the like. The method for forming the matting agent layer is not specifically defined. For example, the layer may be formed according to a coating method, such as a dipping method, an air knife coating method, a curtain coating method, a roller coating method, a wire bar coating method, a gravure coating method, or a slide coating method. The order of forming the matting agent layer and the barrier laminate to be provided on the opposite side is not specifically defined. Preferably, the barrier laminate is first formed on one side, and then the matting agent layer is formed on the opposite side. For example, one preferred embodiment comprises forming at least one barrier laminate on one side of a plastic film, then forming a matting agent layer thereon, and thereafter forming at least one barrier laminate on the other side of the plastic film. The thickness of the matting agent layer is preferably from 100 nm to 800 nm, more preferably from 200 nm to 500 nm.

The water vapor permeability of the barrier film substrate of the invention at 40° C. and a relative humidity of 90% is preferably at most 0.01 g/m²·day, more preferably at most 0.007 g/m²·day, even more preferably at most 0.005 g/m²·day.

<Device>

The barrier laminate and the barrier film substrate of the invention are favorably used for devices that are deteriorated by the chemical components in air (e.g., oxygen, water, nitrogen oxide, sulfur oxide, ozone). Examples of the devices are, for example, organic EL devices, liquid-crystal display devices, thin-film transistors, touch panels, electronic papers, solar cells, and other electronic devices. More preferred are organic EL devices.

The barrier laminate of the invention may be used for film-sealing of devices. Specifically, this is a method of providing a barrier laminate of the invention on the surface of a device serving as a support by itself. Before providing the barrier laminate, the device may be covered with a protective layer.

The barrier film substrate of the invention may be used as a substrate of a device or as a film for sealing up a device according to a solid sealing method. The solid sealing method comprises forming a protective layer on a device, then forming an adhesive layer and a barrier film substrate as laminated thereon, and curing it. Not specifically defined, the adhesive may be a thermosetting epoxy resin, a photocurable acrylate resin, etc.

(Organic EL Device)

Examples of an organic EL device with a barrier film substrate are described in detail in JP-A 2007-30387.

(Liquid-Crystal Display Device)

A reflection-type liquid-crystal display device has a constitution of a lower substrate, a reflection electrode, a lower alignment film, a liquid-crystal layer, an upper alignment film, a transparent electrode, an upper substrate, a λ/4 plate and a polarizing film, formed in that order from the bottom. In this, the barrier film substrate of the invention may be used as the transparent electrode substrate and the upper substrate. In color displays, it is desirable that a color filter layer is additionally provided between the reflection electrode and the lower alignment film, or between the upper alignment film and the transparent electrode. A transmission-type liquid-crystal display device has a constitution of a backlight, a polarizer, a λ/4 plate, a lower transparent electrode, a lower alignment film, a liquid-crystal layer, an upper alignment film, an upper transparent electrode, an upper substrate, a λ/4 plate and a polarizing film, formed in that order from the bottom. In this, the barrier film substrate of the invention may be used as the upper transparent electrode and the upper substrate. In color displays, it is desirable that a color filter layer is additionally provided between the lower transparent electrode and the lower alignment film, or between the upper alignment film and the transparent electrode. Not specifically defined, the type of the liquid-crystal cell is preferably a TN (twisted nematic) type, an STN (super-twisted nematic) type, a HAN (hybrid aligned nematic) type, a VA (vertically alignment) type, an ECB (electrically controlled birefringence) type, an OCB (optically compensatory bend) type, a CPA (continuous pinwheel alignment) type, or an IPS (in-plane switching) type.

(Others)

Other applications of the invention are thin-film transistors as in JP-T 10-512104, touch panels as in JP-A 5-127822, 2002-48913, electronic papers as in JP-A 2000-98326, and solar cells as in Japanese Patent Application No. 7-160334.

<Optical Component>

An example of the optical component that comprises the barrier film substrate of the invention is a circular polarizer.

In case where the barrier film substrate of the invention is combined with a circular polarizer in its use, it is desirable that the barrier layer side of the barrier film substrate faces the inside of the cell, and is disposed in the innermost site (adjacent to the device). In this case, the barrier film substrate is disposed more inside the cell than the circular polarizer, and therefore the retardation of the barrier film substrate is an important factor. In case where the barrier film substrate is used in the manner as above, preferred is any of the following embodiments: the barrier film substrate comprising a substrate film having a retardation of at most 10 nm is laminated with a circular polarizer (¼ wavelength plate+(½ wavelength plate)+linear polarizer); or the barrier film substrate comprising a substrate film having a retardation of from 100 nm to 180 nm, which is usable as a ¼ wavelength plate, is combined with a linear polarizer.

The substrate film having a retardation of at most 10 nm includes cellulose triacetate (FUJIFILM's Fujitac), polycarbonate (Teijin Chemical's Pureace, Kaneka's Elmec), cycloolefin copolymer (JSR's Arton, Nippon Zeon's Zeonoa), cycloolefin copolymer (Mitsui Chemical's Apel (pellets), Polyplastic's Topas (pellets)), polyarylate (Unitika's U100 (pellets)), transparent polyimide (Mitsubishi Gas Chemical's Neoprim), etc.

As the ¼ wavelength plate, usable is a film produced by suitably stretching the above-mentioned film to have a desired retardation.

EXAMPLES

The characteristics of the invention are described more concretely with reference to the following Examples. In the following Examples, the material used, its amount and the ratio, the details of the treatment and the treatment process may be suitably modified or changed not overstepping the sprit and the scope of the invention. Accordingly, the invention should not be limitatively interpreted by the Examples mentioned below.

1. Formation of Organic Layer

A polyethylene terephthalate film (Teijin DuPont's trade name, Teonex Q65FA) was cut into a piece of 20 cm square. On the smooth surface of the film, a mixture solution of a monomer shown in Table 1 (20 g), a UV polymerization initiator (Ciba Speciality Chemicals' trade name, Ciba Irgacure 907) (0.6 g) and 2-butanone (190 g) was applied, using a wire bar, so as to form a liquid layer having a thickness of 5 µm. After dried, this was cured through irradiation with UV rays from an Eye Graphics' metal halide lamp (integrated radiation, about 1.2 J/cm²) in a chamber in which the oxygen concentration was controlled as in Table 1 according to a nitrogen purging method, thereby forming an organic layer. In this, the thickness of the layer was 500 nm +50 nm. The degree of curing of the organic layer was confirmed visually and through IR absorptiometry. According to the above process, samples BP-1 to BP-10 were produced.

The monomer S-1 (Osaka Organic Chemical's V#3PA) and the monomer S-2 (Nippon Kayaku's KAYARAD R-604) used herein each have the following structure.

S-1:

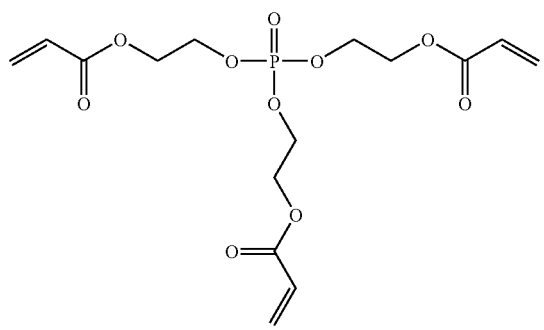

S-2:

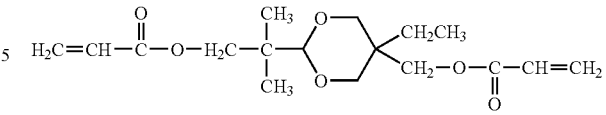

The curability of the organic layer formed herein was evaluated through determination of the degree of polymerization by IR absorptiometry, based on the following standards:
  A: degree of polymerization, at least 85%.
  B: degree of polymerization, from 50% to less than 85%.
  C: degree of polymerization, less than 50%.

The degree of polymerization was determined by IR absorptiometry, as follows: In the IR absorption spectrum of the cured film and that of the monomer mixture, the ratio of the absorption intensity based on the carbonyl group at around 1720 cm$^{-1}$ to the absorption intensity based on the carbon-carbon double bond at around 810 cm$^{-1}$ leads the degree of polymerization, according to the following computational formula 1.

Degree of Polymerization (%)=
  $\{(a \times d - b \times c)/a \times d\} \times 100$    (Computational Formula 1)

wherein a indicates the peak intensity at around 1720 cm$^{-1}$ of the cured film,
b indicates the peak intensity at around 810 cm$^{-1}$ of the cured film,
c indicates the peak intensity at around 1720 cm$^{-1}$ of the monomer mixture,
d indicates the peak intensity at around 810 cm$^{-1}$ of the monomer mixture.

TABLE 1

| Sample No. | Monomer used in forming organic layer | Oxygen Concentration (%) | Curability | Remarks |
|---|---|---|---|---|
| BP-1 | R-1 | <0.1 | A | the Invention |
| BP-2 | R-1 | 21 | A | the Invention |
| BP-3 | R-4 | <0.1 | A | the Invention |
| BP-4 | R-4 | 21 | A | the Invention |
| BP-5 | R-1/S-1 (3/1 by mass) | <0.1 | A | the Invention |
| BP-6 | R-1/S-1 (3/1 by mass) | 21 | A | the Invention |
| BP-7 | S-1 | <0.1 | A | Comparative Sample |
| BP-8 | S-1 | 5 | B | Comparative Sample |
| BP-9 | S-1 | 21 | C | Comparative Sample |
| BP-10 | S-2 | <0.1 | A | Comparative Sample |
| BP-11 | S-2 | 5 | B | Comparative Sample |
| BP-12 | S-2 | 21 | C | Comparative Sample |

(Note)
Oxygen concentration 21% means that the organic layer was formed in air.

2. Production of Barrier Laminate

On the organic layer of each of the organic layer-coated samples BP-1, BP-2, BP-5 to BP-8, BP-10 and BP-11, an inorganic layer of aluminum oxide was formed by sputtering. Aluminum was used as the target in sputtering; and argon gas was used as the discharge gas and oxygen was as the reaction gas. The pressure in film formation was 0.1 Pa. The ultimate thickness of the inorganic layer was 40 nm. According to the above process, produced were barrier laminate samples BPO-1, BPO-2, BPO-5 to BPO-8, BPO-10 and BPO-11.

In the sample BP-9 and the sample BP-12, the organic layer did not cure, and an inorganic layer could not form thereon.

3. Determination of Water Vapor Permeability

A metal Ca was deposited on each barrier laminate sample, BPO-1, BPO-2, BPO-5 to BPO-8, BPO-10 or BPO-11, in a mode of vapor deposition, and the metal-deposited sample and a glass substrate were sealed up with a commercial organic EL sealant with the deposited face thereof kept inside, thereby preparing a sample to be tested. Next, the sample was kept under a controlled condition of 40° C. and 90% RH, and its water vapor permeability was determined from the optical density change of the metal Ca on the barrier laminate film (owing to hydroxylation or oxidation of Ca, the metallic gloss of the surface reduced and the surface was thereby discolored). The result is shown in Table 2. In Table 2, the oxygen concentration is in the atmosphere where the organic layer was formed.

TABLE 2

| Sample No. | Organic Layer Sample | Oxygen Concentration (%) | Water Vapor permeability (g/m² · day) | Remarks |
|---|---|---|---|---|
| BPO-1 | BP-1 | <0.1 | 0.007 | the Invention |
| BPO-2 | BP-2 | 21 | 0.006 | the Invention |
| BPO-5 | BP-5 | <0.1 | 0.003 | the Invention |
| BPO-6 | BP-6 | 21 | 0.003 | the Invention |
| BPO-7 | BP-7 | <0.1 | 0.010 | Comparative Sample |
| BPO-8 | BP-8 | 5 | 0.021 | Comparative Sample |
| BPO-10 | BP-10 | <0.1 | 0.011 | Comparative Sample |
| BPO-11 | BP-11 | 5 | 0.016 | Comparative Sample |

It has been confirmed that the organic layer structure of the invention can well cure even in air, and after an inorganic layer has been formed thereon, the resulting laminate does not still lose its barrier property. On the other hand, the curability of the organic layer structure of the comparative samples lowered with the increase in the oxygen concentration in curing, and with that, the barrier property of the laminate produced by forming an inorganic layer on the organic layer greatly lowered. These confirm that, in the barrier laminate of the invention, the organic layer can be cured in air in its formation, and therefore, the invention does not require any additional equipment such as vacuum equipment and gas pipe equipment, and can simplify the film-forming step. Accordingly, the invention is suitable for industrial mass production of barrier laminates.

4. Production and Evaluation of Organic EL Device (1) Production of Organic EL Device:

An ITO film-coated conductive glass substrate (surface resistivity, 10 Ω/square) was washed with 2-propanol, and then subjected to UV-ozone treatment for 10 minutes. On this substrate (anode), the following organic compound layers were deposited in order according to a vapor deposition method.

| (First Hole Transportation Layer) | |
|---|---|
| Copper Phthalocyanine | thickness 10 nm |
| (Second Hole Transportation Layer) | |
| N,N'-diphenyl-N,N'-dinaphthylbenzidine | thickness 40 nm |
| (Light Emission Layer serving also as electron transportation layer) | |
| Tris(8-hydroxyquinolinato)aluminum | thickness 60 nm |

Finally, lithium fluoride was vapor-deposited in a thickness of 1 nm and metal aluminum was in a thickness of 100 nm in that order, serving as a cathode. On this, a silicon nitride film having a thickness of 5 μm was formed according to a parallel plate CVD method, thereby constructing an organic EL device.

(2) Disposition of Laminate Barrier Film on Organic EL Device:

Using a thermosetting adhesive (Daizo-Nichimori's Epotec 310), the organic EL device was stuck to the barrier laminate, sample BPO-6, and heated at 65° C. for 3 hours to cure the adhesive. A sealed organic EL device was thus produced.

(3) Evaluation of Light-Emitting Surface of Organic EL Device:

Immediately after its production, the organic EL device was driven for light emission at a voltage of 7V applied thereto, using a current/voltage generator (source measure unit, Keithley's SMU2400 Model). Using a microscope, the surface of the sample was checked for its condition with light emission, and it was confirmed that every device gave uniform light emission with no dark spot.

Next, each sample was allowed to stand in a dark room at 40° C. and 90% RH for 60 days and then the light-emitting surface was observed. As a result, the ratio of light-emitting area after storage was 92% of the light-emitting area before storage and no dark spot occurred.

It has been confirmed that the organic EL device sealed up with the barrier film substrate of the invention has excellent wet heat durability.

In the barrier laminate of the invention, the organic layer may be formed in a more simplified manner than before and, in addition, the barrier laminate of the invention has an excellent barrier property. According to the production method of the invention, the barrier film substrate of the invention can be readily produced even in air. In particular, the barrier film substrate of the invention is useful as a substitute for conventional glass substrates, and is widely applicable to broad-range industrial products such as typically organic EL devices, etc.

While the present invention has been described in detail and with reference to specific embodiments thereof, it will be apparent to one skilled in the art that various changes and modifications can be made therein without departing from the spirit and scope thereof.

The present disclosure relates to the subject matter contained in Japanese Patent Application No. 74411/2008 filed on Mar. 21, 2008, which is expressly incorporated herein by reference in its entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A barrier laminate having at least one organic layer and at least one inorganic layer, in which the organic layer contains a polymer having a structural unit of the following formula (1) or the following formula (2):

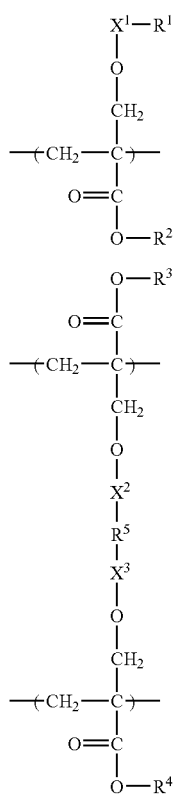

wherein $R^1$ represents a hydrogen atom or a hydrocarbon group; $R^2$ to $R^4$ each independently represent a hydrocarbon group; $R^5$ represents an alkylene group which may have an ether group inserted into the chain; $X^1$ to $X^3$ each independently represent a single bond or a carbonyl group.

2. A method for producing a barrier laminate having at least one organic layer and at least one inorganic layer, which comprises polymerizing a monomer mixture that contains at least one monomer of the following formula (3) or the formula (4) to form the organic layer:

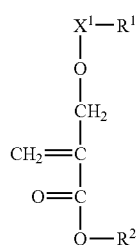

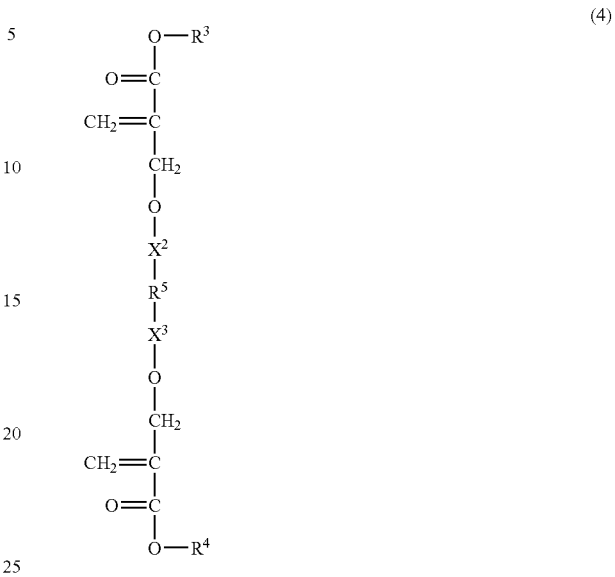

wherein $R^1$ represents a hydrogen atom or a hydrocarbon group; $R^2$ to $R^4$ each independently represent a hydrocarbon group; $R^5$ represents an alkylene group which may have an ether group inserted into the chain; $X^1$ to $X^3$ each independently represent a single bond or a carbonyl group.

3. The method for producing a barrier laminate according to claim 2, wherein the organic layer is formed in the presence of oxygen.

4. A barrier laminate produced by the method of claim 2.

5. A barrier film substrate having a barrier laminate of claim 1 on at least one surface of a plastic film.

6. The barrier film substrate according to claim 5, which has at least one layer of the barrier laminate and a matting agent layer formed thereon, on one surface of the plastic film, and has at least one layer of the barrier laminate on the other surface thereof.

7. A device comprising the barrier laminate of claim 1.

8. The device according to claim 7, wherein the barrier laminate is used for sealing.

9. The device according to claim 7, wherein a barrier film substrate having the barrier laminate on at least one surface of a plastic film is used as a substrate of the device.

10. The device according to claim 8, wherein a barrier film substrate having the barrier laminate on at least one surface of a plastic film is used for sealing.

11. The device according to claim 7, which is an electronic device.

12. The device according to claim 7, which is an organic EL device.

13. An optical component having, as a substrate thereof, the barrier film substrate of claim 5.

* * * * *